United States Patent [19]
Chiu

[11] Patent Number: 5,749,284
[45] Date of Patent: May 12, 1998

[54] EARTHEN KILN COOKING POT

[76] Inventor: Chun-Mu Chiu, Fl., 1, No. 304, Wu Feng N. Rd., Chia Yi City, Taiwan

[21] Appl. No.: 871,553

[22] Filed: Jun. 9, 1997

[51] Int. Cl.$^6$ .................... A23L 1/00; A47J 27/00
[52] U.S. Cl. .................... 99/340; 99/403; 99/426; 99/447; 99/449; 126/25 R; 126/9 R
[58] Field of Search .................... 99/339, 340, 400, 99/401, 403, 410, 426, 428, 430, 444–446, 447–449, 450, 483, 451, DIG. 15; 126/25 R, 9 R, 30; 431/253, 328, 354; 426/523

[56] References Cited

U.S. PATENT DOCUMENTS

| | | | |
|---|---|---|---|
| 3,555,992 | 1/1971 | Fritzberg | 426/523 |
| 3,809,056 | 5/1974 | Snelling | 99/476 X |
| 4,100,682 | 7/1978 | Corrigan | 99/447 |
| 4,471,748 | 9/1984 | Venable | 99/339 |
| 4,588,371 | 5/1986 | Nakamura et al. | 126/93 |
| 4,637,376 | 1/1987 | Varney et al. | 126/682 |
| 4,767,316 | 8/1988 | Nakamura et al. | 126/95 |
| 4,817,510 | 4/1989 | Kowalics et al. | 99/348 |
| 5,024,208 | 6/1991 | Hottenroth et al. | 126/25 R |
| 5,203,316 | 4/1993 | Pritchett | 126/9 R |
| 5,281,131 | 1/1994 | Goldstein | 431/253 |
| 5,355,782 | 10/1994 | Blanchard | 99/467 X |
| 5,434,390 | 7/1995 | McKee et al. | 99/475 |

*Primary Examiner*—Timothy F. Simone
*Attorney, Agent, or Firm*—David & Raymond; Raymond Y. Chan

[57] ABSTRACT

An earthen kiln cooking pot comprising a pot body, a plurality of erection posts and a plurality of support columns, whereby in its application a pit is dug on the ground, the material so dug out is used to fill the erection posts and the support columns and to cover the surface of the pot body where the material is retained within the pot body by means of the retention wall while the ventilation tube is exposed outside the material; then the support columns are arranged around the circumference of the pit according to the size of the pot body, the erection posts are placed on the support columns, and the pot body is placed on the erection posts to complete the erection of the present invention; for cooking purpose a fuel is placed and burned within the pit to heat the pot body, the erection posts and the support columns as well as the material therein while by action of the ventilation tube on the pot body, the fuel is kept on burning, till the pot body, the erection posts and the support columns as well as the material therein reach a certain temperature and the fire is extinguished, the erection posts and the support columns are placed within the pit, an appropriate quantity of food, such as potato, corn, and meal is placed in the pit and the pot body is used to cover up the food; finally, by heating effect of the residual heat energy in the pot body, the erection posts and the support columns as well as the material therein, the food is cooked.

5 Claims, 5 Drawing Sheets

EARTHEN KILN COOKING POT

BACKGROUND OF THE INVENTION

1. Field of the Invention

The present invention relates to an earthen kiln cooking pot, particularly an earthen kiln cooking pot which is easy to erect and easy to carry, and which can be used conveniently for a traditional Chinese cooking method without limit of earth property.

2. Description of the Prior Art

Earthen kiln cooking is a traditional Chinese cooking method in the field. It involves the building of a compartment, i.e., a kiln with earth on the ground, heating of the kiln by combustion till a certain temperature is reached, and then food, such as sweet potato, corn, and meat, are placed in the kiln of relatively high temperature, the kiln is collapsed to cover up the food. By the residual heat of the earth the food is heated. The food cooked in this way is particularly delicious, its smell can be spread widely. Particularly during the time of cooking, the people there can have a great fun.

Following the progress of time and the development of industry, the traditional Chinese earthen kiln cooking method has encountered the following situations:

1. Lack of suitable earth: Earth, mainly clay or clayey earth, is the most important material for earthen kiln cooking. But it is not available in the urban area, people today does not have abundant energy or time to go to the field to look for clay or clayey earth, but use of other type of earth may not be able to build he kiln and heat the food thoroughly, thus the food so cooked may not be healthy enough.

2. The earth is not clean: In the industrial communities, most of the earth have been contaminated by industrial waste, particular waste from chemical factories, which are harmful to the human being's health. Therefore, covering of such earth on the food would contaminate the foods and it is risky to the human being's health.

SUMMARY OF THE INVENTION

In view of the above defects, the inventor has designed an earthen kiln cooking pot as a substitute to the traditional kiln in order to provide the people today another choice of cooking method.

The present invention is an earthen kiln cooking pot which use the good heat conductivity of metal to substitute the earth and to achieve the traditional taste of earthen kiln cooking. Its features include:

1. Easy to build: By arrangement of some blocks which is much easier than building of a kiln and hence it will provide much more time for leisure purpose;
2. High flexibility in cooking location: The earthen kiln cooking pot can be erected at any place as long as there is earth, and hence arrangement of itinerary for traveling can be more flexible;
3. Short cooking time: The high conductivity of meal and the good thermal insulation effect of earth can complete the cooking within a short time and consequently minimize fuel consumption;
4. Good health condition: The earth does not cover the food directly and hence contamination to the food is prevented.
5. Easy to carry: All the components can be put into a bag to ease transportation.

The main objective of the present invention is to provide an earthen kiln cooking port which can be erected at any place without limit on earth property.

Another objective of the present invention is to provide a design of an earthen kiln cooking pot to assure healthy condition in cooking.

Another objective of the present invention is to provide a design of an earthen kiln cooking pot which can be erected within a very short time to meet the need of people who are usually very busy.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

Figure 1:
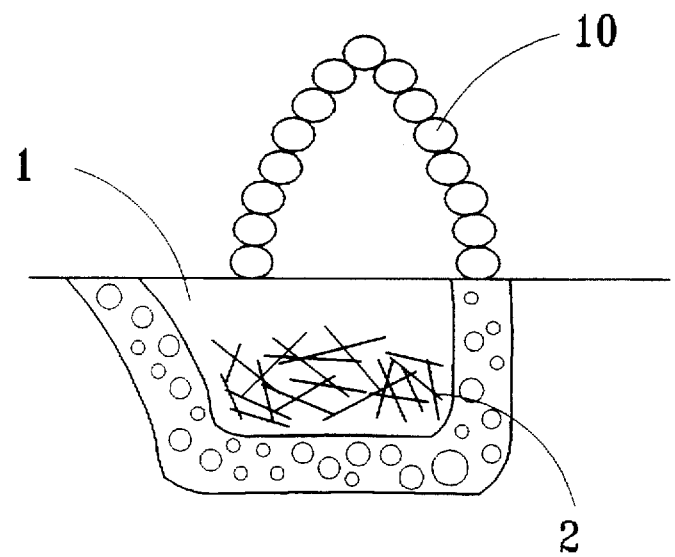
FIG. 1 illustrates the erection of a traditional earthen kiln.
Figure 2:
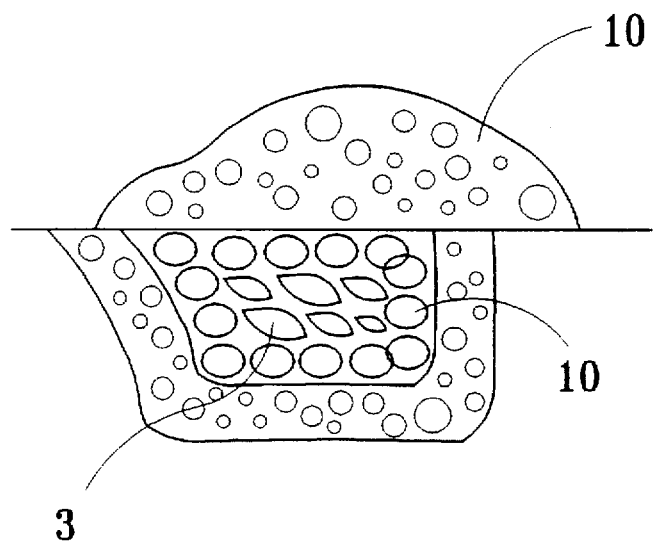
FIG. 2 illustrates a cooking with the traditional earthen kiln.

Please refer to FIGS. 1 and 2 for a traditional earthen kiln cooking method. A pit 1 is dug at a place with suitable earth property, the material 10 so dug out is used to build a kiln with a certain height over the pit 1. Then a certain quantity of fuel 2 is placed and combusted within the pit to heat the material 10. When the material 10 reaches a suitable temperature for embedded cooking, the fire is extinguished, and the food 3 to be cooked is placed within the pit. Then, the material 10 is broken to cover up the food 10. By the residual thermal energy in the material 10, the food is heated for a predetermined length of time. With such a method, the building of the kiln is not easy, and there is question about health condition of the food.

Figure 3:
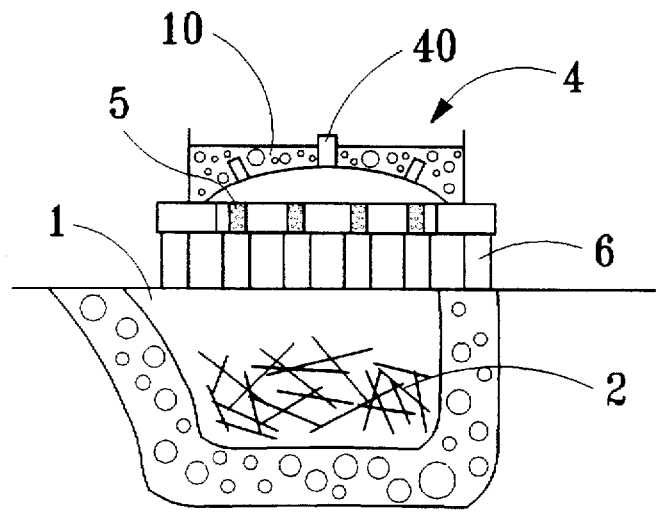
FIG. 3 illustrates an erection of the present invention.
Figure 4:
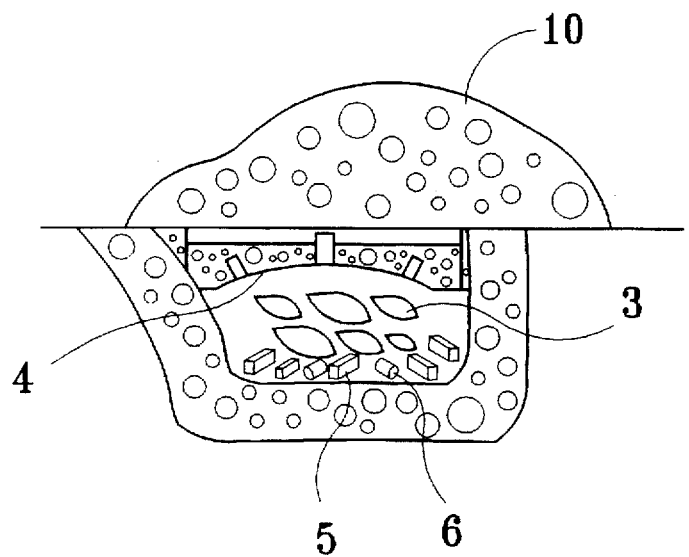
FIG. 4 illustrate a cooking with the present invention.
Figure 5:
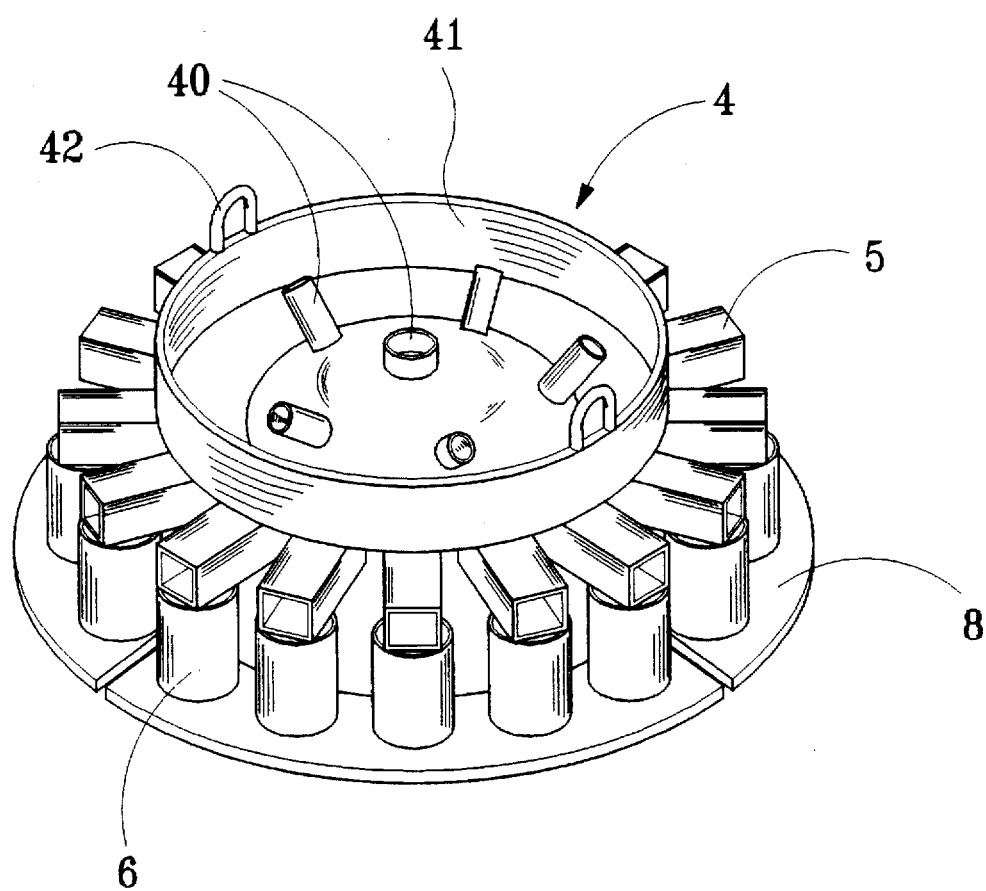
FIG. 5 is a perspective view of the present invention.

Please refer to FIGS. 3 thru 5 for an earthen kiln cooking pot according to the present invention. It comprises mainly a pot body 4, a plurality of erection posts 5 and support columns 6. The pot body 4 is slightly projected at the center, and is designed with a ventilation tube on the top surface. The pot body 4 is surrounded with a retention wall 41. Feature of the present invention is described below.

First of all, a pit 1 is dug at any place with any earth property. The material 10 so dug out is used to fill the erection posts 5 and the support columns 6, and to cover the surface of the pot body 4 where the material 10 is retained within the pot body 4 by means of the retention wall 41 and the ventilation tube 40 is exposed outside the material 10. Then, the support columns 6 are arranged around the circumference of the pit 1 according to the size of the pot body 4, the erection posts 5 are placed on the support columns 6, and finally the pot body 4 is placed on the erection posts 6 to complete the erection of the present invention.

For cooking purpose a fuel 2 such as pieces of dried bamboo or wood are placed and ignited within the pit 1 to heat the pot body 4, the erection posts 5 and the support columns 6 as well as the material 10 therein. By action of the ventilation tube 40 on the pot body 4, the fuel is kept on burning. When the pot body 4, the erection posts 5 and the support columns 6 as well as the material 10 therein reach a certain temperature (at piece of earth may be placed at the ventilation tube at the very beginning of heating, when such a piece of earth become hot red, it indicates that the present invention reaches a baking temperature), the fire is extinguished, the erection posts 5 and the support columns 6 are placed within the pit 1, an appropriate quantity of food 3 (such as potato, corn, meat, etc. is placed in the pit 1 and the pot body 4 is used to cover up the food 3. Then, by heating effect of the residual heat energy in the pot body 4, the erection posts 5 and the support columns 6 as well as the material 10 therein, the food 4 is heated till it is suitable for eating. It is very easy to erect the present invention, and it can be erected at any place with any earth property. Moreover, the food 3 itself do not contact with the earth, it is very healthy, and heating is very convenient by the good heat conductivity or thermal insulation effect of the respective components.

Figure 6:
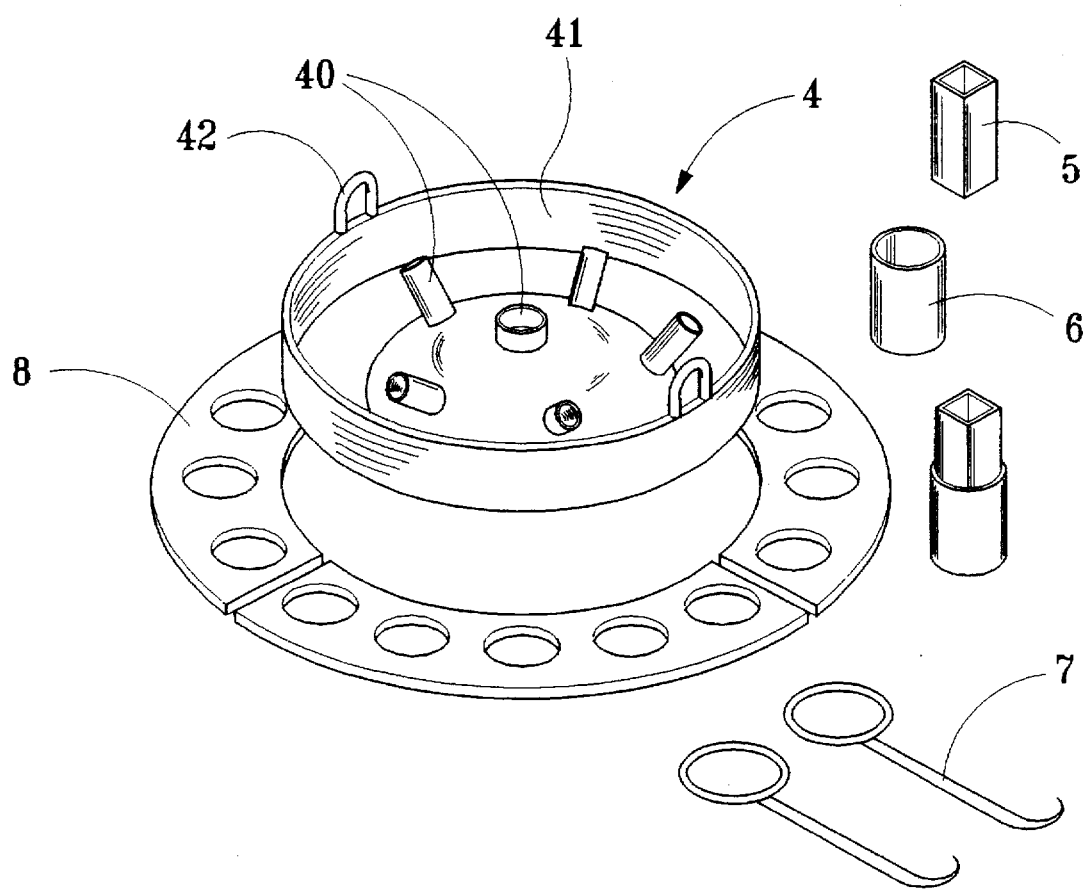
FIG. 6 is a fragmented perspective view of the present invention.
Figure 7:
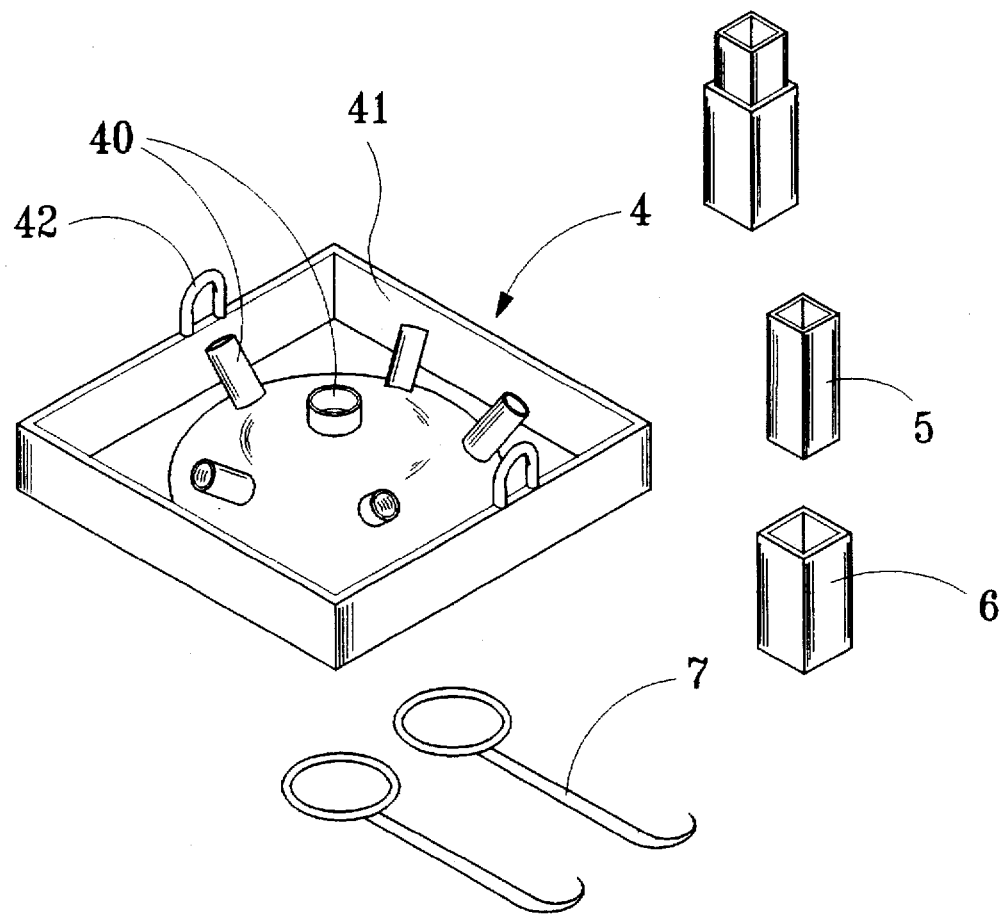
FIG. 7 illustrates another embodiment of the present invention.

Please refer to FIGS. 6 and 7, two lugs 42 may be designed on the pot body 4 and two hook elements 7 may be used to pick up the pot body 4 without the risk of being injured by the hot pot body 4. Moreover, a base 8 may be designed to ease arrangement and placing of the support columns to make the erection more stable. The base 8 is composed of a plurality of blocks and thus it is very convenient in arrangement and transportation. The erection posts 5 and the support columns are of hollow tubular structure, and they can be designed of different sizes so that one of them can be inserted into the other to ease transportation. Of course, the shape of the pot body 4 can be of different design to meet different users' different preferences or to suit the site, such as spherical, cubic or polygonal within the scope of the patent invention.

Many changes and modifications in the above described embodiment of the invention can, of course, be carried out without departing from the scope thereof. Accordingly, to promote the progress in science and the useful arts, the invention is disclosed and is intended to be limited by the scope of the appended claims.

What is claimed is:

1. An earthen kiln cooking pot comprising a pot body with a slight projection in the center, a ventilation tube on the top surface and a retention wall surrounding its circumference;

a plurality of hollow erection posts to support the pot body;

a plurality of hollow support columns to support the erection posts;

whereby in its application a pit is dug on the ground, the material so dug out is used to fill the erection posts and the support columns and to cover the surface of the pot body where the material is retained within the pot body by means of the retention wall while the ventilation tube is exposed outside the material; then the support columns are arranged around the circumference of the pit according to the size of the pot body, the erection posts are placed on the support columns, and the pot body is placed on the erection posts to complete the erection of the present invention; for cooking purpose a fuel is placed and burned within the pit to heat the pot body, the erection posts and the support columns as well as the material therein while by action of the ventilation tube on the pot body, the fuel is kept on burning, till the pot body, the erection posts and the support columns as well as the material therein reach a certain temperature and the fire is extinguished, the erection posts and the support columns are placed within the pit, an appropriate quantity of food is placed in the pit and the pot body is used to cover up the food; finally, by heating effect of the residual heat energy in the pot body, the erection posts and the support columns as well as the material therein, the food is cooked.

2. An earthen kiln cooking pot as claimed in claim 1 further comprising a base in the form of a single block or a plurality of blocks and firmed with openings to stabilize the said support columns.

3. An earthen kiln cooking pot as claimed in claim 1 wherein the pot body is formed with lugs for picking up by means of hooks to avoid injury due to high temperature of the pot body.

4. An earthen kiln cooking pot wherein the erection posts and the support posts can be designed with opening at one end of both ends to facilitate filling of earth.

5. An earthen kiln cooking pot as claimed in claim 1 wherein the pot body can be spherical, cubic or polygonal.

* * * * *